No. 858,597. PATENTED JULY 2, 1907.
H. J. HALLE.
MANIFOLDING MECHANISM.
APPLICATION FILED JAN. 4, 1906.
7 SHEETS—SHEET 2.
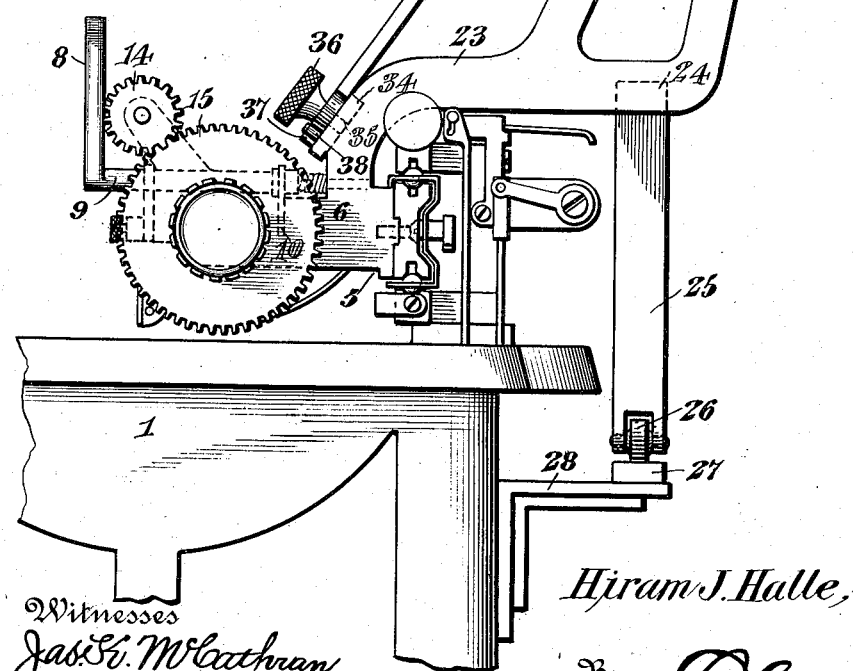

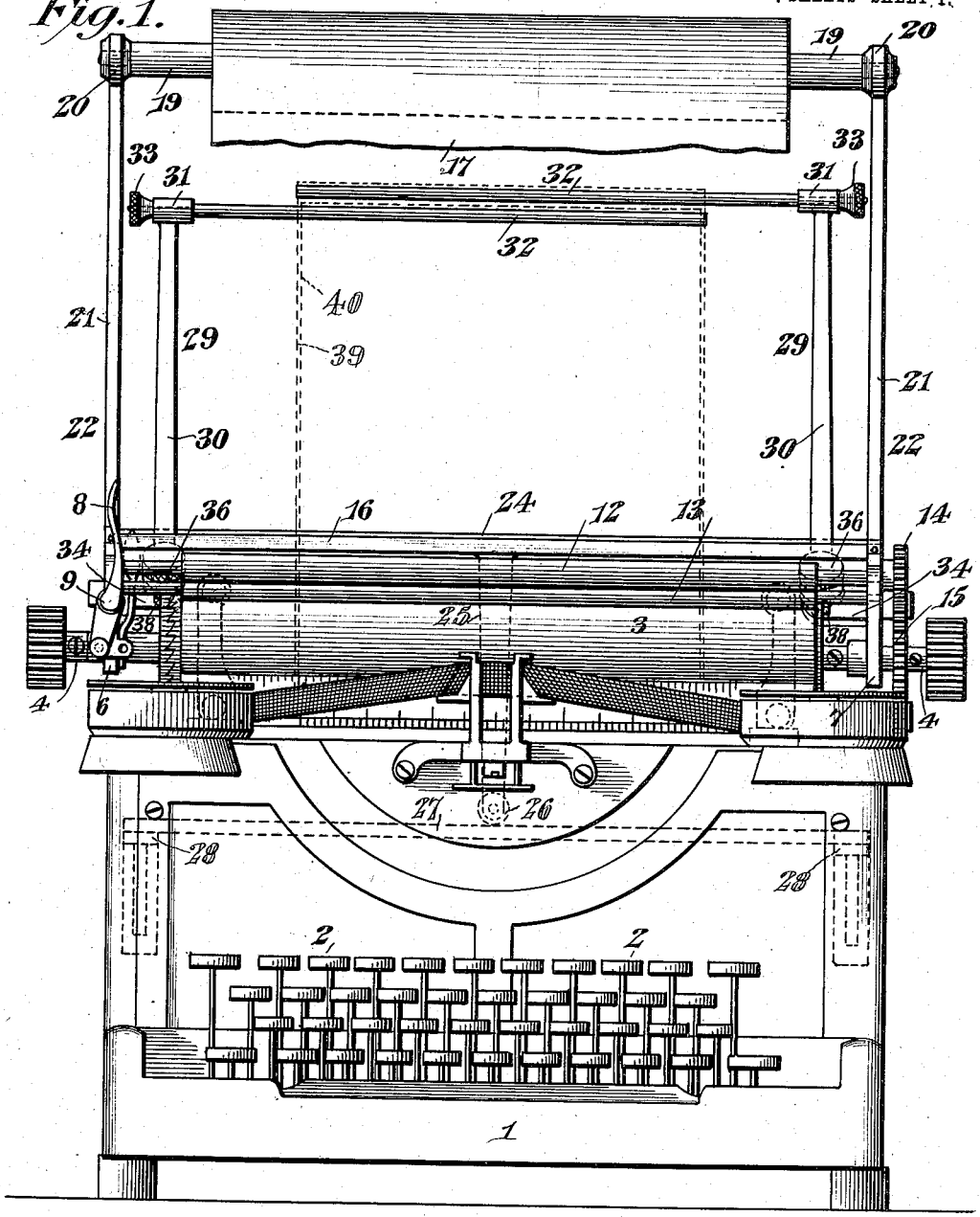

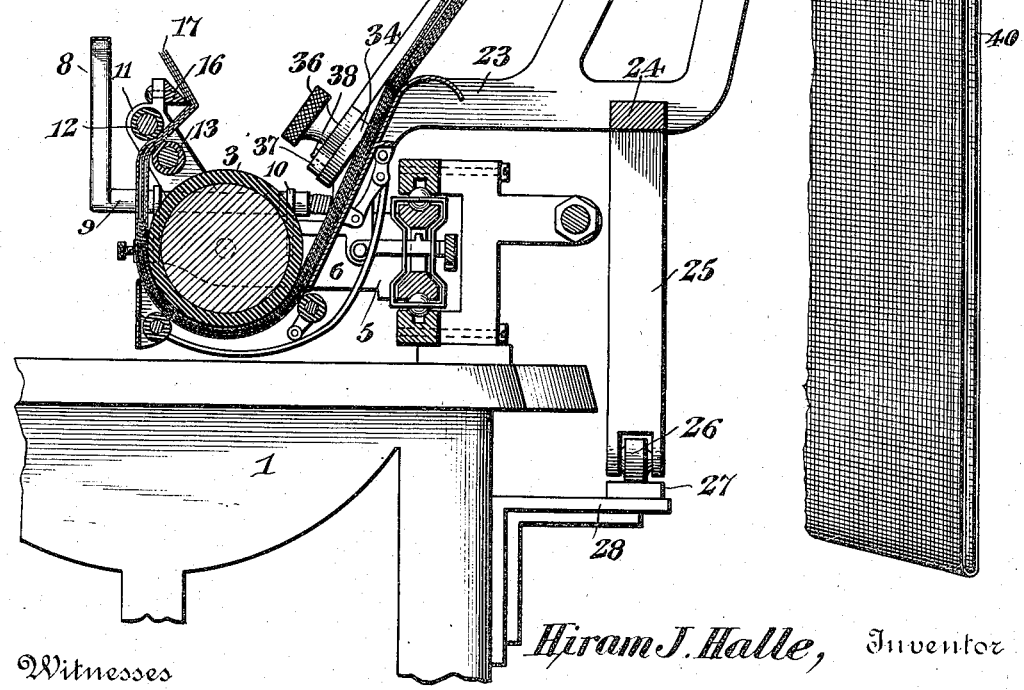

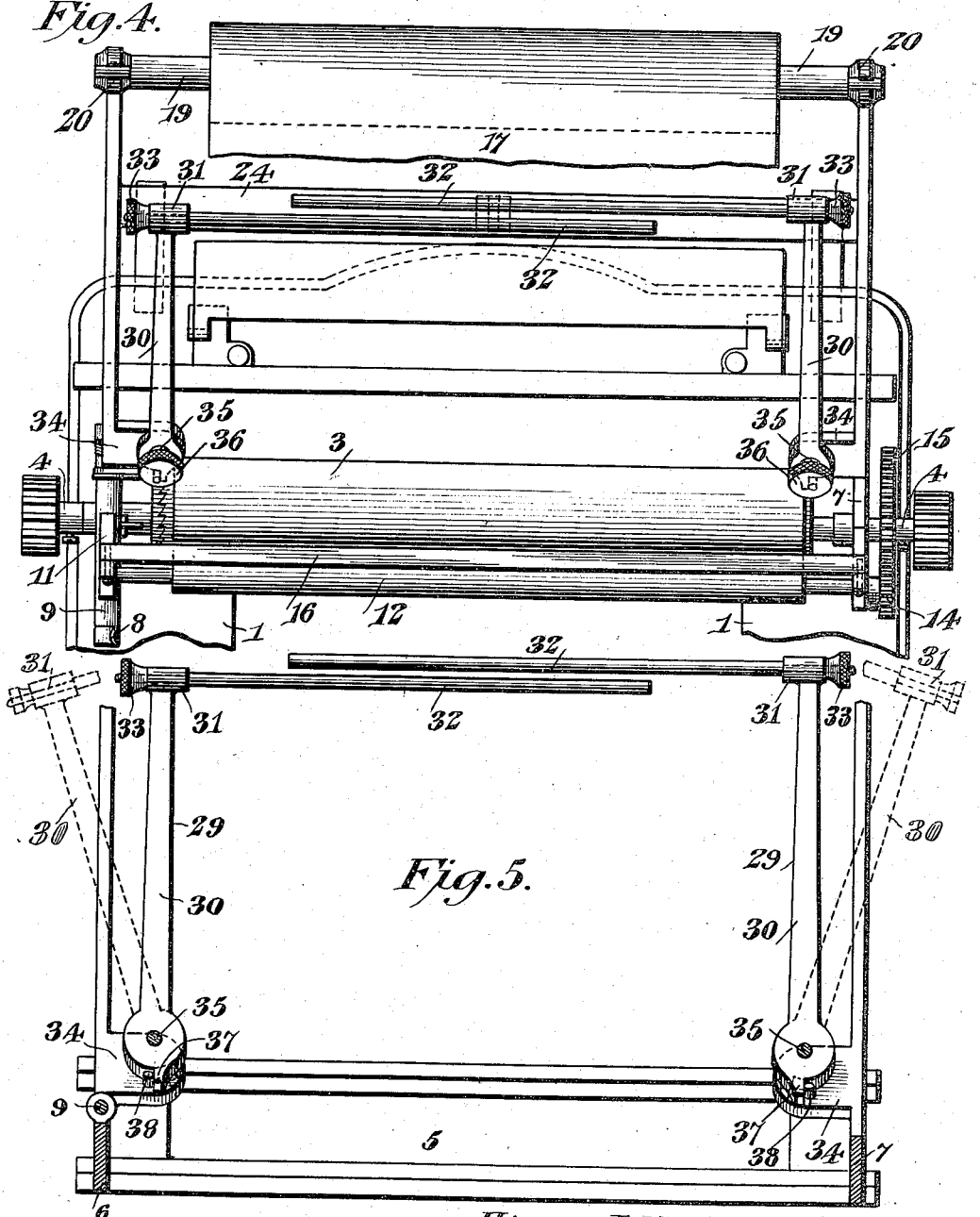

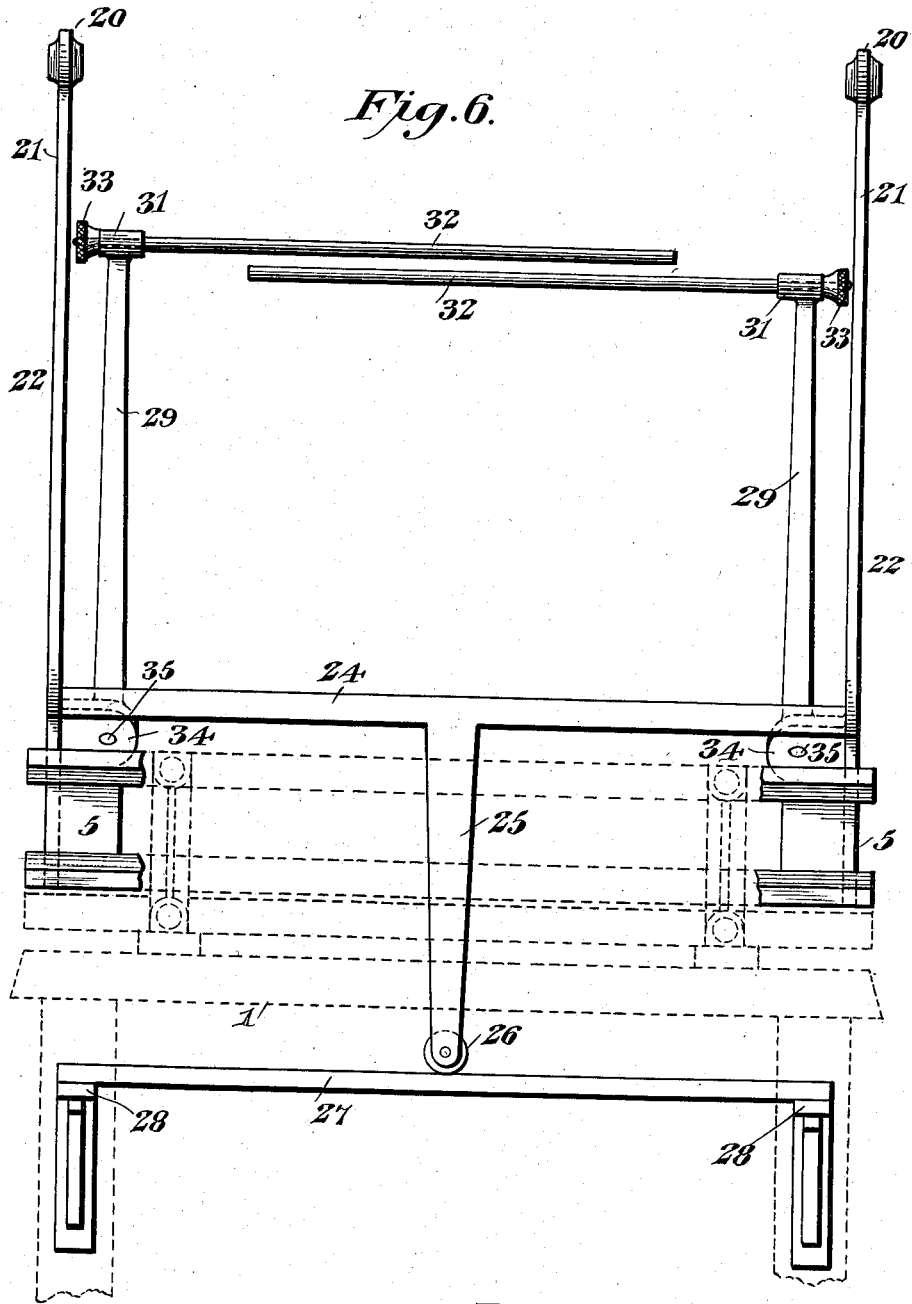

No. 858,597. PATENTED JULY 2, 1907.
H. J. HALLE.
MANIFOLDING MECHANISM.
APPLICATION FILED JAN. 4, 1906.

7 SHEETS—SHEET 6.

Hiram J. Halle, Inventor

Witnesses
Jas. V. McCathran
Louis G. Julihn

By C. G. Siggers
Attorney

No. 858,597. PATENTED JULY 2, 1907.
H. J. HALLE.
MANIFOLDING MECHANISM.
APPLICATION FILED JAN. 4, 1906.

7 SHEETS—SHEET 7.

Hiram J. Halle, Inventor

Witnesses
Attorney

UNITED STATES PATENT OFFICE.

HIRAM J. HALLE, OF NEW YORK, N. Y., ASSIGNOR TO ELLIOTT-FISHER COMPANY, OF NEW YORK, N. Y., A CORPORATION OF DELAWARE.

MANIFOLDING MECHANISM.

No. 858,597.      Specification of Letters Patent.      Patented July 2, 1907.

Application filed January 4, 1906. Serial No. 294,659.

*To all whom it may concern:*

Be it known that I, HIRAM J. HALLE, a citizen of the United States, residing at New York, in the county of New York and State of New York, have invented a new and useful Manifolding Mechanism for Type-Writers, of which the following is a specification.

This invention relates to typewriting machines, and more particularly to mechanism facilitating the production of manifold typewritten records of extensive statements or accounts, such for instance, as the shipping and expense accounts of railroads.

The object of the invention is to equip a standard typewriter—to-wit, one including a movable cylindrical platen,—with means facilitating manifolding, as, for instance, by the use of a long manifold strip having a plurality of sheets, layers or plies connected by one or more folds extending longitudinally of the strip.

To the accomplishment of this object, the preferred embodiment of the invention comprehends the provision of means for supporting and guiding the manifold strip, means for supporting carbons or other transfer elements between the layers of said strip, and means for feeding the strip independently of the carbon.

Other objects of the invention, and further structural features thereof, will be pointed out during the course of the succeeding description of the illustrated embodiment of the invention.

Figure 11:
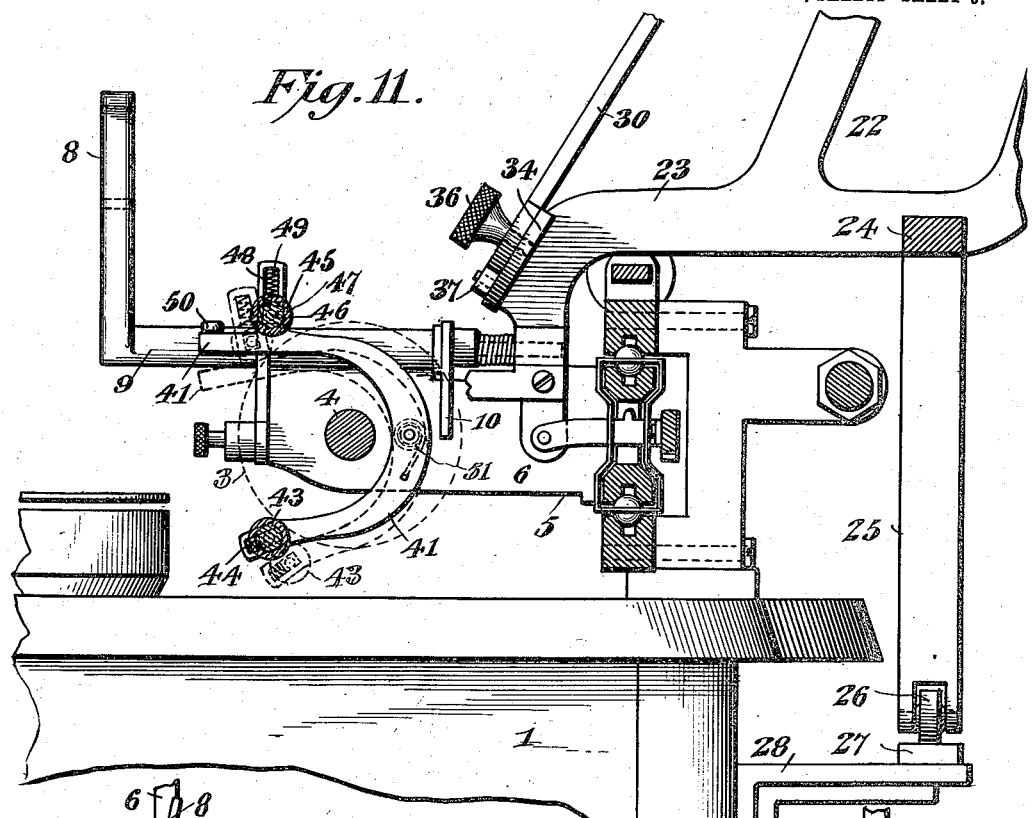
Figure 12:
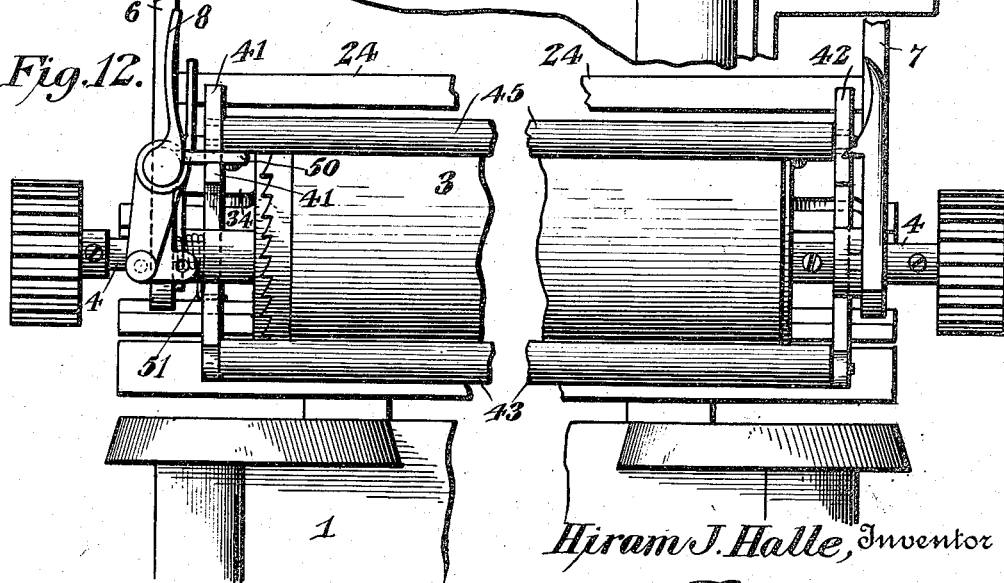
Figure 13:
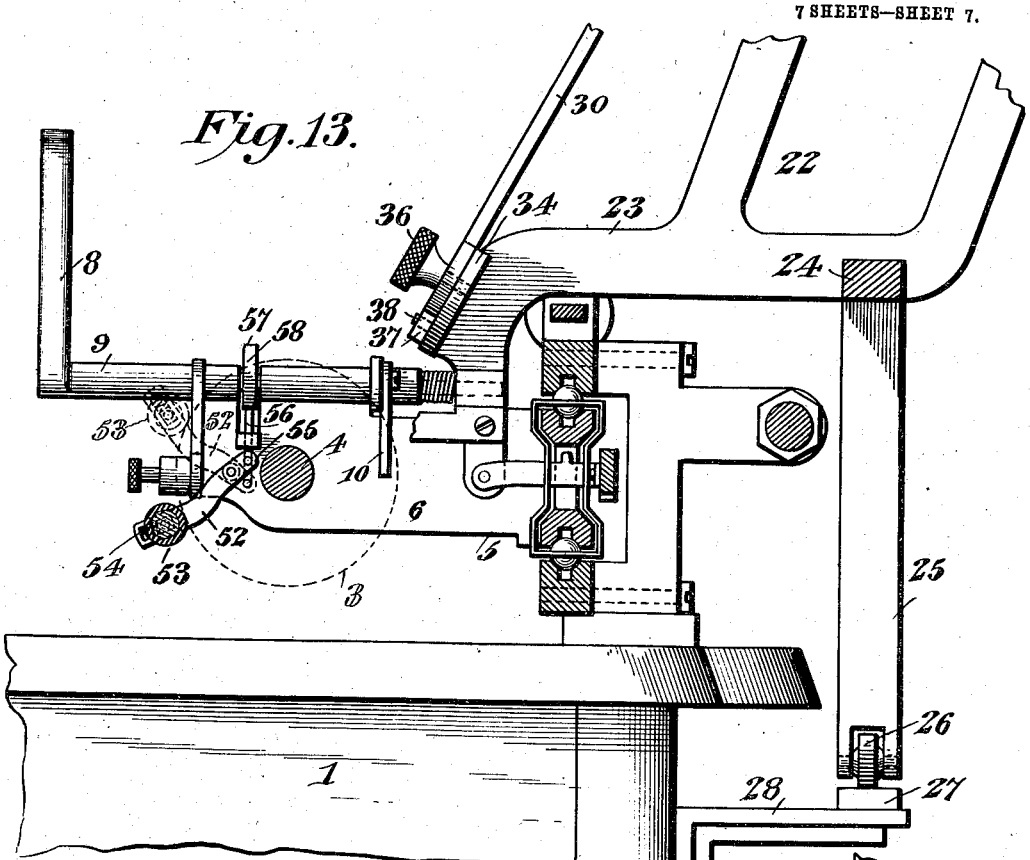
Figure 14:
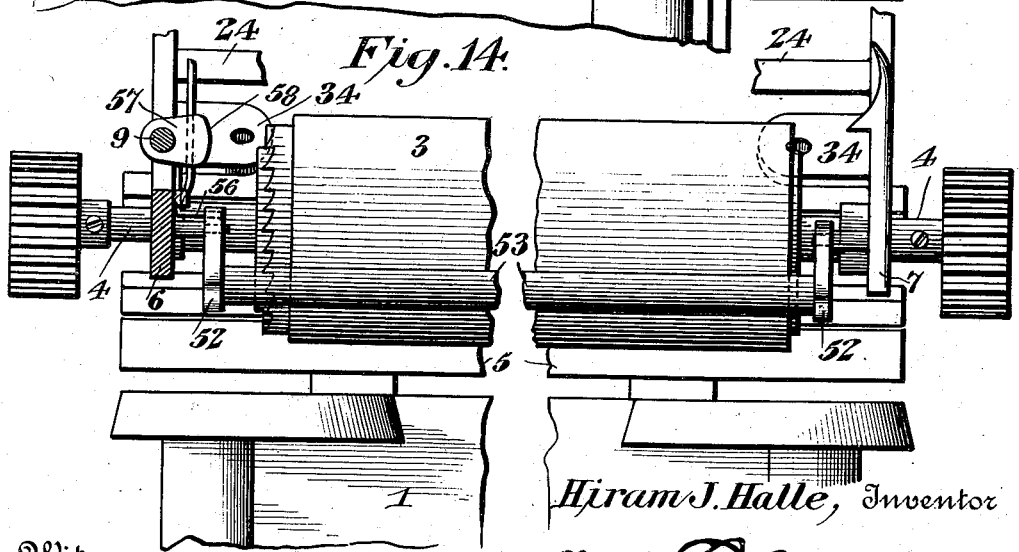

In the accompanying drawings—Figure 1 is a front elevation of a typewriter equipped in accordance with my invention. Fig. 2 is a side elevation of so much of the structure as is necessary to illustrate the novel features thereof. Fig. 3 is a vertical sectional view of the same. Fig. 4 is a plan view of the structure shown in Fig. 3. Fig. 5 is a detail view illustrating the construction of the carbon holders and the manner in which the same are mounted. Fig. 6 is a rear elevation of the novel structure with portions of the typewriter shown in dotted lines. Fig. 7 is a detail perspective view of portions of the manifold strip and endless carbons.
Fig. 8 is a perspective view of a portion of one of the carbons or transfer elements. Fig. 9 is a sectional view of the strip and carbons. Fig. 10 is a detail view of a portion of a modified form of carbon. Fig. 11 is a sectional view of a portion of the typewriter, showing a modified form of paper feeding mechanism applied thereto. Fig. 12 is a front elevation of the subject-matter of Fig. 11. Fig. 13 is a view similar to Fig. 11, but showing another form of paper feeding mechanism, and Fig. 14 is a front elevation of the subject-matter of Fig. 13.

Each part is indicated by the same numeral throughout the views.

1 indicates the frame of a Monarch typewriter, 2 the keys thereof, 3 the usual cylindrical platen, 4 the platen shaft, and 5 the movable carriage supporting the platen 3 the shaft 4 of which is journaled in the end bars 6 and 7 of the carriage 5.

8 indicates the usual line spacing lever extended from a rock shaft 9 journaled in a sleeve bearing formed at the upper side of the bar 6, the usual spacing dog 10 being operated by this shaft to engage and rotate the platen 3 in a manner well understood in the art.

In accordance with my present invention, the end bars 6 and 7 of the carriage 5 are provided with extensions 11 in which are journaled the opposite ends of a pair of paper feeding rolls 12 and 13 located above the printing point of the platen. As shown in Fig. 3, the rolls 12 and 13 are disposed parallel with the platen 3, but out of contact therewith, with their axes in position to be intersected by a line extended radially with respect to the platen 3 at an angle of approximately forty-five degrees.

The feed rolls 12 and 13 are designed when operated to have the same peripheral speed as the platen 3. To accomplish this result, a pinion 14 is fixed at the right hand end of the roll 12 and meshes with a comparatively large gear wheel 15, secured to the shaft 4 of the platen, the gear and pinion being so proportioned that when the platen is rotated, the platen and the paper feed rolls will have corresponding movement. The extensions 11 of the end bars 6 and 7 also constitute supports for the opposite ends of a paper cutter or knife 16, extending rearwardly adjacent to the feed rolls 12 and 13 to facilitate the severing of the printed portion of the manifold strip 17 which is led under the platen and between the feed rolls from a suitable source of supply. The source of paper supply is preferably in the form of a paper roll 18 wound upon a core 19 journaled at its ends in the bifurcated upper extremities 20 of two vertically disposed bars 21 constituting the side members of a paper supporting frame indicated as a whole by 22. The main portions of these side bars or members are disposed vertically above and in rear of the typewriting machine, but are provided with angular lower ends 23 which extend forwardly and downwardly for attachment to the rear ends of the bars 6 and 7 of the carriage.

The side arms 21 are connected adjacent to their lower ends by a transverse frame member or bar 24, see Figs. 3 and 6, from the middle of which extends downwardly a support 25 provided at its lower end with a roller 26 mounted to travel on a track 27 secured to the back of the typewriter frame as by brackets 28. It will thus appear that the paper supporting frame, while connected with the typewriter carriage, is also supported independently thereof from the frame of the typewriter in a manner to insure the free and substantially antifrictional movement of the carriage, notwithstanding the addition thereto of the paper roll and the supporting structure therefor.

At this point attention is directed to the fact that while it is preferable to support the manifold strip 17 in the form of a roll and to support the roll for movement with the typewriter carriage, neither of these characteristics of the present disclosure is essential, since the strip may be led around the platen from a roll supported independently of the typewriter carriage, or from a loosely folded pile, or in fact from any other suitable source of supply. In any event, however, it is desirable to utilize the core 19 as a guiding or deflecting bar over which the strip may be led and thence carried down to the platen and around the under side thereof. When it is considered that the manifold strip is in the form of a long sheet of paper folded back and forth along longitudinal folds to secure a series of layers or plies in superposed relation and each connected along one longitudinal edge to the edge of an adjacent ply or layer, the difficulty of using transfer elements or carbons for the transference of impressions from one layer to another will be apparent.

In accordance with my invention, the manifolding of the record is accomplished through the medium of what I term floating carbons or transfer elements, so called because they preferably hang loose or float from a carbon support extending along one edge only of the carbon. The carbon supports or carriers 29 are disposed at the opposite sides of the paper supporting frame 22 and each comprises a vertically disposed swinging arm 30 formed at its upper end with a horizontal sleeve 31 for the reception of one end of a horizontally disposed carbon supporting rod 32 adapted to extend within a fold of the manifold strip and having its outer end threaded for the reception of a nut 33, see Fig. 5.

While the mounting of the arms 29 may be varied within wide limits, they are preferably pivoted upon lugs 34 extending inwardly from the angular lower ends of the side members 21 of the frame 22, the pivotal connection between each arm 29 and a lug 34 being effected by means of a clamping screw 35 having a knurled head 36 by means of which the screw may be tightened to insure the retention of the carbon holder in proper position. In order to positively prevent the carbon holders from swinging inward beyond their normal positions, said arms are provided at their lower ends with stop lugs 37 disposed to engage stop pins 38 projecting from the supporting lugs or ears 34. It will be seen therefore that the carbon carriers may swing outwardly, as indicated in dotted lines in Fig. 5, to facilitate the attachment of the carbons to the bars 32, after which the carriers may be swung inwardly to present the carbons within opposite folds of the manifold strip.

In Fig. 3 of the drawings the carbons 39 and 40 are in the form of endless bands of any suitable transfer material, as for instance, carbon paper, inked fabric, or the like, suspended from the bars 32 and located within opposite folds of the manifold strip. The carbons hang from the bars 32 and extend under the platen and around the front side thereof to a point slightly above the printing point of the platen. Therefore, when the outer layer of the manifold strip is printed upon by the manipulation of the typewriter, the record thus produced will be transferred to the second or intermediate layer of the manifold strip by the carbon 39, and will be simultaneously reproduced upon the inner layer of the strip by the carbon 40. It will be noted by reference to Fig. 3 that the carbons are supported independently of the paper and that the paper feeding mechanism grips the manifold strip at a point beyond the advanced ends of the carbons, so that, when the platen is rotated, the paper will be advanced independently of the carbon.

In the ordinary manipulation of a typewriter, the paper and carbon sheets are fed in unison by the rotation of the platen, pressure rollers being employed to clamp the sheets against the platen to insure the feeding thereof when the platen is rotated. This arrangement, while efficient for the simultaneous feeding of the paper and carbon, does not permit of the paper being fed independent of the intermediate transfer element. It is for this reason that my invention embraces the provision of special paper feeding mechanism which clamps the paper only and avoids the use of clamping devices which would hold the paper and carbon jointly at the paper feeding point or during the operation of feeding the paper.

By employing endless carbon or transfer elements, unused portions thereof may be readily presented at the printing point, to accomplish which it is simply necessary to draw the carbon over its supporting bar. Instead of the endless carbons or transfer elements, however, single leaves or sheets of transfer material may be employed, as shown in Fig. 10. In this event, the upper edge of the carbon will be looped around the supporting bar, as shown, or otherwise attached.

In Figs. 11 and 12 a modified form of paper feeding means is shown. In this construction two substantially U-shaped rockers 41 and 42 are pivotally mounted on the end bars 6 and 7 of the typewriter carriage in rear of the platen shaft, with their arms extending forwardly. Between the lower arms of these rockers extends a pressure roll 43 urged toward the platen by springs 44 mounted in the arms of the rockers. The pressure roll 43 is located below the printing point of the platen as usual in typewriters of this class and is designed to clamp the paper and carbons against the platen in the usual manner. Extending between the upper arms of the rockers 41 and 42 is a paper feeding roll 45 located above the printing point of the platen and normally removed from the surface thereof. The trunnions 46 of the roll 45 are received within bearing blocks 47 slidably mounted in comparatively long vertical slots 48 formed in the arms of the rockers, said blocks being normally retained at the lower ends of the slots by springs 49. Extending laterally from the line spacing rock shaft 9 is an arm 50 disposed over and in coöperative relation with the upper arm of the rocker 41. As is well understood in the art, there is more or less lost motion in the connection between the shaft 9 and the platen, a portion of the rocking movement of the shaft being employed to establish the connection between the line spacing pawl and the ratchet, and the further movement of the shaft serving to rotate the platen. In accordance with my invention, the initial lost motion of the shaft 9 is employed for the actuation of the rockers 41 and 42 and the rolls 43 and 45 carried thereby. When the line spacing lever 8 is swung in the usual manner, the initial portion of such movement causes the arm 50 to depress the rocker 41 for the purpose of withdrawing the pressure roll 43 from the platen and for simultaneously presenting the paper feeding roll 45 to the platen. The parts will then occupy the position shown in dotted lines in Fig. 11, and, while the pressure is removed from the paper and carbons, the paper will be clamped against the platen at a point above the advanced ends of the carbons. Continued movement of the line spacing lever 8 will now rotate the platen, which, coöperating with the paper feeding roll 45, will advance the paper independently of the carbons, it being noted that this feeding movement of the arm 8 will serve to further depress the rockers 41 and 42, the movement thereof independently of the paper feeding roll being accommodated by the slots 48. When the line spacing lever 8 is retracted, the rockers 41 and 42 and the rolls carried thereby will be restored to their normal positions by a spring 51 acting on the rocker 41.

Attention is directed to the fact that the paper feeding mechanism just described is similar to the mechanism shown in Fig. 3 in this, that the elements thereof clamp the paper alone at a point beyond the advanced ends of the carbons, as distinguished from the ordinary paper feeding mechanism which is so located that both the paper and the transfer elements are clamped against the platen during the feeding operation. In Figs. 13 and 14 a further variation of the paper feeding mechanism is shown. In this case a pair of arms 52 are pivoted to the end bars 6 and 7 of the typewriter carriage in advance of the platen shaft. Between the forward ends of these arms is extended a combined clamping and paper feeding roll 53 yieldingly urged toward the platen by springs 54 carried by the arms. Normally, the roll 53 is located below the printing point of the platen and serves to clamp the paper and carbons against the platen surface. When the line spacing lever 8 is operated, however, the arms 52 are swung up to the dotted position shown in Fig. 13 to present the roll 53 above the advanced ends of the carbons so as to clamp the paper alone against the platen. To effect this movement of the arms 52, one of said arms is provided with an extension 55 in rear of its axis and to this extension is secured a tappet 56 coöperatively related to a cam 57 mounted on the shaft 9. The form of the cam 57 is such that during the initial movement of the shaft 9, which is necessary to establish the connection between it and the platen, the tappet 56 will be depressed, thus effecting the shifting of the roll 53 from its normal position below the printing point to its position above the printing point. The tappet 56 will then be held in this position, during the feeding movement of the line spacing lever, by a dwell surface 58 concentric with the axis of the cam.

It may be stated in conclusion that while the mechanism described is especially designed to facilitate the use of a manifold strip in the production of manifold records, it is also adapted for use in connection with a series of separated or detached strips of paper such as are ordinarily employed in continuous manifolding.

It is thought that from the foregoing, the construction and operation of my invention will be clearly comprehended, and I desire to be understood as reserving the right to effect such changes, modifications and variations in the illustrated structures as may come fairly within the scope of the protection prayed.

What I claim is:—

1. In a typewriting machine, as a means for producing manifold records, the combination with a rotary platen, of mechanism coöperating therewith to feed a plurality of paper sheets, and means for retaining a loosely suspended interposed transfer element stationary during the advance of the paper sheets.

2. In a typewriter, as a means for producing manifold records, the combination with a rotary platen, of means for retaining paper sheets opposite the platen, a holder disposed parallel with the axis of the platen, and a transfer element loosely suspended from the holder and interposed between the paper sheets.

3. In a typewriter, as a means for producing manifold records, the combination with a rotary platen, of means for retaining a plurality of paper sheets opposite the platen, paper feeding means located at the delivery side of the platen, a holder located at the receiving side of the platen, and a transfer element loosely suspended from the holder and interposed between the paper sheets, said transfer element extending in the direction of the paper feed.

4. In a typewriter, as a means for producing manifold records, the combination with a platen, of means for delivering a plurality of superposed paper sheets to the platen, a holder interposed between the paper sheets, a transfer element loosely suspended from the holder, and paper feeding means engaging the paper sheets at a point beyond the advanced end of the transfer element.

5. In a typewriter, as a means for producing manifold records, the combination with a platen, of a plurality of loosely suspended transfer elements, means for delivering a plurality of paper sheets to the platen in alternation with the transfer elements, and paper feeding means engaging the paper beyond the advanced ends of the transfer elements.

6. In a typewriting machine, as a means for producing manifold records, the combination with a platen, of means for leading a longitudinally folded strip to the platen from a point above the same, a transfer element suspended within a fold of said strip, and means for feeding the manifold strip independently of the transfer element.

7. In a typewriting machine, as a means for producing manifold records, the combination with a rotary platen, a folded strip led to the platen, a transfer element located within a fold of said strip, and paper feeding means engaging the folded strip beyond the advanced edge of the transfer element.

8. In a typewriting machine, as a means for producing manifold records, the combination with a rotary platen, of a folded strip led to the platen, a holder disposed transverse to the manifold strip and extended into a fold thereof, and a transfer element suspended from the holder.

9. In a typewriter, as a means for producing manifold records, the combination with a rotary platen, of a folded strip led to the platen from a point above the same, a holder disposed transverse to the strip and extended within a fold thereof, a transfer element suspended from the holder and extended opposite the printing point of the platen, and paper feeding means engaging the manifold strip beyond the advanced end of the transfer element and operative to advance the strip independently of said element.

10. In a typewriter, as a means for producing manifold records, the combination with a platen, of means for retaining transfer elements within opposite folds of a manifold sheet or strip led to the platen from a point above the same.

11. In a typewriter, as a means for producing manifold records, the combination with a platen, of means mounted independently thereof for retaining transfer elements within opposite folds of a manifold sheet or strip led to the platen from a point above the same.

12. In a typewriting machine, as a means for producing manifold records, the combination with a platen, of an elevated paper support, and oppositely disposed carbon holders located between said support and the platen and adapted for reception within opposite folds of a manifold sheet or strip.

13. In a typewriting machine, as a means for producing manifold records, the combination with a platen, of an elevated paper support, a carbon support located between the paper support and the platen, and paper feeding means arranged to engage the paper beyond the printing point of the platen.

14. In a typewriter, the combination with the typewriter carriage, of a carbon holder carried thereby and also having independent movement longitudinally thereof to facilitate the insertion of the holder between superposed sheets of paper.

15. In a typewriter, the combination with the typewriter carriage, of a pair of carbon carriers mounted thereon and movable in opposite directions to facilitate their insertion within opposite folds of a manifold sheet or strip.

16. In a typewriter, the combination with the typewriter carriage, of an elevated paper support movable with the carriage, and a plurality of carbon supports located between the paper support and the carriage and movable in opposite directions to facilitate their presentation to and their withdrawal from opposite folds of a manifold sheet or strip let downwardly from the elevated paper support.

17. In a typewriting machine, the combination with a platen and paper feeding means, of a transfer element led around the platen from a point in rear thereof and terminating short of the paper feeding means, and a paper cutter located beyond the paper feeding means.

18. In a typewriter, the combination with the platen, of a holder, and an endless transfer element suspended loosely from the holder and led around the platen, said platen being uninclosed by the transfer element.

19. The combination with a typewriter including a rotary platen and printing mechanism, of means supporting a longitudinally folded paper strip led around the platen, means supporting a transfer web within the folded paper strip, and means for feeding the folded strip independently of the transfer element located therein.

20. The combination with a typewriter including a rotary platen and printing mechanism, of means supporting a longitudinally folded paper strip led around the platen, means supporting a transfer web within the folded paper strip, and means for feeding the folded strip independently of the transfer element located therein, said feeding means engaging the paper outside of or beyond the limits of the transfer element to prevent smudging or smearing of the paper by the pressure of the feeding mechanism thereon as said paper is moved relative to the transfer web.

21. The combination with a typewriter including a rotary platen and printing mechanism, of means retaining a folded paper strip led to the platen, a holder disposed transverse to the strip and extended into a fold thereof, and a transfer element retained within the folded strip by the holder.

22. The combination with a typewriting machine including a rotary platen and printing mechanism, of means retaining a manifold paper strip led to the platen, oppositely disposed transfer holders extended into opposite folds of the strip, and transfer elements retained within opposite folds of the paper strip by said holders.

23. The combination with a typewriting machine including a rotary platen and printing mechanism, of means supporting a manifold paper strip led to the platen, oppositely disposed transfer holders extended into opposite folds of the paper strip, transfer elements retained within the opposite folds of the paper strip by said holders, and means for feeding the paper strip independently of the transfer elements.

In testimony that I claim the foregoing as my own, I have hereto affixed my signature in the presence of two witnesses.

HIRAM J. HALLE.

Witnesses:
A. H. KOMSTEDT,
R. F. ROGERS.